Patented Dec. 31, 1946

2,413,549

UNITED STATES PATENT OFFICE 2,413,549

VITREOUS COMPOSITION

Alden J. Deyrup, Westfield, N. J., assignor to E. I. du Pont de Nemours & Company, Wilmington, Del., a corporation of Delaware No Drawing. Application September 23, 1944, Serial No. 555,597

10 Claims. (Cl. 106—53)

This invention relates to certain novel vitreous compositions or glasses which are particularly characterized by extremely low electrical loss properties. My novel vitreous compositions are unique in that they possess, to an exceptional degree, those properties which render them useful for dielectric purposes.

The application is a continuation-in-part of my copending application Serial No. 504,888, filed October 4, 1943.

Vitreous compositions or glasses have previously been used as insulating media and supporting structures for conductive members in electrical and radio apparatus. Vitreous materials have also been utilized as the dielectric elements in the fabrication of electrical capacitors or electrical condensers such as those disclosed, for example, in the copending application of Ballard, Serial No. 494,627, filed July 14, 1943. When utilized for such purposes vitreous compositions or glasses possess outstanding advantages as regards strength, ease of fabrication, stability or constancy of the dimensions and relatively low electrical losses when subjected to direct current electrical potentials. However, when these previously known vitreous compositions or enamels are subjected to alternating electrical potentials of high frequency, such as those occurring in radio circuits and similar apparatus, their use as glass insulators, glass supporting bodies, or as dielectric media, dielectric losses occur which result in reducing the efficiency of the entire circuit. In many cases the electrical losses introduced by the use of these vitreous compositions are so great that glass cannot be used for the insulators, supports, or for the dielectric layers or media in electrical capacitors.

The electrical losses of a capacitor may be expressed either in terms of power factor or of Q-value. The power factor is defined as the sine of the dielectric loss angle, and Q-value is the reciprocal of the tangent of this angle. Since for small angles the sine and tangent are identical within negligible percent error, the Q figure is for practical purposes the reciprocal of the power factor. As Q-values for low-loss dielectrics lie in the range 200–10,000, the Q-value is a convenient integral index figure, increase of which denotes an improvement in electrical merit of a capacitor, and is used in this specification to define my invention. In strict accuracy, the efficiency of a dielectric substance is expressed by "Q-factor" and the efficiency of a capacitor made from the same substance as "Q-value." However, as under most common conditions, the major losses are in the dielectric substance, it is usual to refer to the "Q" of a dielectric such as that of my invention without specifying which of the two terms is meant.

In an effort to find a more satisfactory material fused quartz has sometimes been used to replace these vitreous compositions or glasses. Quartz possesses a much higher electrical efficiency, more particularly, a higher Q-value, than the lower-melting glasses and vitreous compositions previously available. The usefulness of fused quartz is offset, however, by its extremely high melting point, which effectively limits its utilization to specialized uses where its low power factor is sufficiently important to offset the difficulty and expense of fabrication.

I have now discovered certain novel vitreous compositions or glasses, melting within the range of melting points usual in enamel compositions and ordinary glasses, which vitreous compositions are characterized by lower dielectric losses and higher Q-values than previously obtainable with vitreous compositions. In fact, the new vitreous compositions of relatively low melting points when utilized in electrical apparatus have a Q-value which either compares very favorably with that of fused quartz or, in many cases, is superior to that of fused quartz. The possibility of producing vitreous compositions or glasses of relatively low melting point having electrical properties of the order indicated has never been previously considered possible in the art of preparing such compositions for use in the manufacture of electrical apparatus such as capacitors and insulators.

In most instances, in the past, when vitreous materials were utilized in preparing ceramic capacitors, the dielectric medium being formed of a vitreous composition, the capacitors were of relatively low electrical efficiency, this efficiency generally not exceeding that equivalent to a Q-value of 1000 at a frequency of a million cycles per second.

Accordingly, it is an object of this invention to provide the electrical industry with vitreous compositions of relatively low melting point, compositions melting within the ranges usual for enamels or glasses of usual character, which novel vitreous compositions possess Q-values of an order never previously considered attainable. It is another object of this invention to provide vitreous compositions or glasses of relatively low melting point, these novel compositions being characterized by low dielectric losses and high Q-value, being either equal to or superior in these properties to fused quartz now sometimes employed for insulators and dielectrics. Still another object of this invention is to furnish the art with certain novel vitreous compositions particularly adaptable for use as dielectric media in electrical capacitors or electrical condensers, the use of these vitreous compositions permitting the preparation of capacitors of extremely satisfactory character and high electrical efficiency. These and still other objects of my invention will be apparent from the ensuing description of certain preferred embodiments thereof.

My novel vitreous compositions, characterized by exceptionally high Q-values and other desirable electrical properties, comprise: lead oxide; silicon oxide; one or more of the oxides of the alkali metals selected from the group consisting of potassium, sodium and lithium; one or more of the oxides of the bivalent metals selected from the group consisting of magnesium, strontium, zinc, barium, calcium and beryllium; and fluorine in combination as a metallic fluoride. More particularly, these ingredients must be present within the composition ranges of mole percentages defined below in Table I; these mole percentages being the number of gram molecular weights of an ingredient in relation to the total gram molecular weights of all ingredients in the composition. This means of expression of composition, commonly used in the chemical arts, is used in Table I in preference to weight percentage because it serves to define more accurately and narrowly the composition range of my novel vitreous compositions.

TABLE I

| | Mole percent |
|---|---|
| Lead oxide, PbO | 15–25 |
| Silica, $SiO_2$ | 34–47 |
| Alkali metal oxide, $R_2O$ | 3–11 |
| Alkali metal fluoride, RF | 5–11 |
| Bivalent metal oxide, RO | 11–30 |

In this table $R_2O$ denotes an alkali metal oxide selected from the group which consists of potassium oxide, $K_2O$; sodium oxide, $Na_2O$; and lithium oxide, $Li_2O$. Either a single alkali metal oxide, or any mixture or combination thereof, may be utilized, the total amount constituting at least 3 mole percent but not exceeding 11 mole percent based on the total vitreous composition. In this table RO denotes an oxide of a bivalent metal selected from the group which consists of magnesium oxide, MgO; strontium oxide, SrO; zinc oxide, ZnO; barium oxide, BaO; calcium oxide, CaO; and beryllium oxide, BeO. Either a single one of these bivalent metal oxides, or any mixture or combination thereof, may be utilized, the total amount constituting at least 11 mole percent but not exceeding 30 mole percent of the total vitreous composition. In this table RF denotes the fluorides of sodium, potassium or lithium separately or in combination. To obtain the best results it is, furthermore, preferred that the ratio of the mole percentage of silica ($SiO_2$) to the sum of the mole percentages of the lead oxide (PbO) and the bivalent metal oxide or oxides (MgO, SrO, ZnO, BaO, CaO, BeO) in the composition should lie between 0.65:1 and 1.5:1.

My novel vitreous compositions may be produced by melting any suitable batch composition and in Table II there are listed several batch compositions which, when melted, will result in vitreous glass compositions falling within the mole percentage ranges noted. The percentages in Table II are by weight, based on the total weight of the batch.

When melted, these batches will yield vitreous compositions having the above described improved electrical properties, the calculated compositions of these vitreous products being given in Table III on a mole percentage basis. For purposes of comparison, these compositions have also been calculated on a weight percentage basis and are so expressed in Table IV. In Tables III and IV vitreous material A is produced by melting batch A of Table II, vitreous composition B by melting batch B of Table II, etc.

In practicing my invention the batch composition to be utilized is first prepared and then melted to yield a substantially homogeneous fluid glass. The temperature maintained during melting is not critical but is usually within the range 1,000–1,200° C. in order that rapid homogenization of the melt may be obtained.

After a homogeneous fluid product is secured, it may be further processed or fabricated by any process well-known in the art. It may, for example, be drawn or blown, or pressed into form of desired objects. Or, if desired, it may be poured into water or other liquid to form a frit which may then be subsequently ground or comminuted to a powder. The product in this powdered form may then be utilized, as by firing, in order to sinter or fuse it into any massive form or any desired shape.

In preparing insulators, capacitors, or other articles from my novel vitreous compositions it is desirable to anneal the products thoroughly, as I have found that not only is the mechanical strength increased thereby, but that annealing also results in an improvement in the electrical efficiency of the material.

In practicing my invention the batch mixtures given in Table II, or any other suitable batch compositions may be employed in producing the vitreous compositions of Tables III and IV which may then be utilized to produce glasses of high electrical efficiency and a high Q-value, these glasses being characterized by varying nature according to the particular choice from the table in properties such as fluidity, softening point, stability against devitrification, and those other properties characteristic of vitreous compositions. It is possible to depart somewhat from the specific examples tabulated provided compositions having the constituents present within the mole percentage ranges given are utilized. However, for maximum electrical efficiency, I have found it desirable to utilize not one but several of the alkali metal oxides together in the composition. Further I find it preferable to include more than one bivalent metal oxide from the group of magnesium oxide, strontium oxide, zinc oxide, barium oxide, calcium oxide and beryllium oxide. The most preferred oxides in this group are combinations of magnesium oxide, strontium oxide and zinc oxide. In some cases I may prefer, as in Example H in Tables II, III and IV, to include 1% to 4%, by weight, of antimony oxide in the batch composition as I find that this serves to stabilize these glasses, when used in the form of powdered enamel, against the harmful reducing or carbonizing effects of organic vehicles which may be used for their dispersion. I have generally found it undesirable to include boron oxide in the vitreous compositions, as the presence of this constituent tends to reduce electrical efficiency to an appreciable degree. Thus, the vitreous compositions disclosed in my copending application Serial No. 421,245, filed December 1, 1941, were found to have electrical characteristics no better than those of ordinary glasses, even though the ranges of some of the constituents in those vitreous compositions overlap the ranges in which they are present in my improved vitreous compositions of high electrical efficiency. This illustrates the specific nature of the compositions prepared in accordance with this invention.

TABLE II

*Batch compositions suitable for producing calculated compositions of Tables III and IV, weight percent*

| Ingredients | Batch | | | | | | | | | | | |
|---|---|---|---|---|---|---|---|---|---|---|---|---|
| | A | B | C | D | E | F | G | H | I | J | K | L |
| Red lead (Pb$_3$O$_4$) | 48.5 | 50.9 | 49.6 | 49.2 | 50.4 | 41.7 | 49.2 | 50.0 | 39.1 | 37.4 | 36.9 | 47.3 |
| Flint (SiO$_2$) | 24.2 | 25.4 | 22.3 | 24.6 | 25.2 | 20.7 | 24.6 | 25.0 | 19.6 | 18.8 | 18.4 | 23.6 |
| Potassium carbonate (2K$_2$CO$_3$.3H$_2$O) | 4.0 | 12.7 | 4.1 | | 4.2 | 3.5 | 4.1 | 12.5 | 3.3 | 3.1 | 3.1 | 3.9 |
| Soda ash (Na$_2$CO$_3$) | 2.4 | | 2.5 | | | 2.1 | 2.5 | | 2.0 | 1.9 | 1.8 | 2.4 |
| Lithium carbonate (Li$_2$CO$_3$) | 1.6 | | 1.7 | 4.9 | 1.7 | 1.3 | 1.6 | | 1.3 | 1.2 | 1.2 | 1.6 |
| Sodium fluoride (NaF) | 4.0 | 4.2 | 4.1 | | 4.2 | 3.5 | 4.1 | 4.2 | 3.3 | 3.1 | 3.1 | 3.9 |
| Potassium fluoride (KF) | | | | 5.7 | | | | | | | | |
| Magnesium oxide (MgO) | 3.2 | 6.8 | 3.3 | 3.3 | 3.4 | 2.8 | 1.6 | 6.6 | | | | |
| Strontium nitrate (Sr(NO$_3$)$_2$) | 12.1 | | 12.4 | 12.3 | 2.5 | 24.4 | 12.3 | | 22.9 | 32.5 | | 11.8 |
| Zinc oxide (ZnO) | | | | | 8.4 | | | | | | 9.2 | |
| Barium carbonate (BaCO$_3$) | | | | | | | | | | | 24.5 | |
| Whiting (CaCO$_3$) | | | | | | | | 6.5 | | | | |
| Beryllium oxide (BeO) | | | | | | | | | | | | 5.5 |
| Antimony oxide (Sb$_2$O$_3$) | | | | | | | | 1.7 | | | | |
| Sodium zirconium silicate (55% ZrO$_2$, 29% SiO$_2$, 14% Na$_2$O) | | | | | | | | | 2.0 | 2.0 | 1.8 | |

TABLE III

*Calculated composition, mole percentage*

| Ingredient | Composition of vitreous material | | | | | | | | | | | |
|---|---|---|---|---|---|---|---|---|---|---|---|---|
| | A | B | C | D | E | F | G | H | I | J | K | L |
| PbO | 23.2 | 22.5 | 24.2 | 23.2 | 22.3 | 21.4 | 24.2 | 22.3 | 20.6 | 21.0 | 19.0 | 20.0 |
| SiO$_2$ | 44.0 | 42.6 | 41.3 | 44.1 | 42.5 | 40.3 | 46.0 | 42.5 | 40.5 | 41.4 | 36.9 | 37.8 |
| K$_2$O | 2.7 | 7.8 | 2.8 | | 2.6 | 2.5 | 2.8 | 7.7 | 2.4 | 2.4 | 2.2 | 2.3 |
| Na$_2$O | 2.5 | | 2.6 | | | 2.3 | 2.6 | | 2.8 | 2.9 | 2.4 | 2.2 |
| Li$_2$O | 2.3 | | 2.6 | 7.1 | 2.3 | 2.1 | 2.4 | | 2.1 | 2.1 | 1.9 | 2.1 |
| NaF | 10.4 | 10.1 | 10.9 | | 10.1 | 9.8 | 11.0 | 10.2 | 9.5 | 9.5 | 8.7 | 9.0 |
| KF | | | | 10.5 | | | | | | | | |
| MgO | 8.7 | 17.0 | 9.1 | 8.8 | 8.5 | 8.1 | 4.5 | 16.7 | | | | |
| SrO | 6.2 | | 6.5 | 6.3 | 1.2 | 13.5 | 6.5 | | 13.1 | 19.7 | | 5.4 |
| ZnO | | | | | 10.5 | | | | | | 13.3 | |
| BaO | | | | | | | | | | | 14.6 | |
| CaO | | | | | | | | 7.9 | | | | |
| BeO | | | | | | | | | | | | 21.2 |
| Sb$_2$O$_3$ | | | | | | | | 0.6 | | | | |
| ZrO$_2$ | | | | | | | | | 1.1 | 1.0 | 1.0 | |

TABLE IV

*Calculated composition, weight percentage*

| Ingredient | Composition of vitreous material | | | | | | | | | | | |
|---|---|---|---|---|---|---|---|---|---|---|---|---|
| | A | B | C | D | E | F | G | H | I | J | K | L |
| PbO | 53.2 | 53.3 | 54.6 | 53.6 | 52.0 | 48.8 | 54.1 | 52.2 | 46.8 | 45.8 | 39.7 | 51.8 |
| SiO$_2$ | 27.1 | 27.1 | 25.1 | 27.4 | 26.6 | 24.9 | 27.7 | 26.8 | 24.8 | 24.3 | 20.8 | 26.4 |
| K$_2$O | 2.6 | 7.8 | 2.7 | | 2.5 | 2.4 | 2.6 | 7.6 | 2.4 | 2.2 | 1.9 | 2.5 |
| Na$_2$O | 1.6 | | 1.6 | | | 1.5 | 1.7 | | 1.8 | 1.8 | 1.4 | 1.6 |
| Li$_2$O | 0.7 | | 0.8 | 2.2 | 0.7 | 0.6 | 0.7 | | 0.6 | 0.6 | 0.6 | 0.7 |
| NaF | 4.5 | 4.5 | 4.6 | | 4.4 | 4.2 | 4.6 | 4.5 | 4.0 | 3.9 | 3.4 | 4.4 |
| KF | | | | 6.4 | | | | | | | | |
| MgO | 3.6 | 7.3 | 3.7 | 3.7 | 3.6 | 3.3 | 1.8 | 7.1 | | | | |
| SrO | 6.7 | | 6.9 | 6.7 | 1.3 | 14.3 | 6.8 | | 13.8 | 20.0 | | 6.5 |
| ZnO | | | | | 8.9 | | | | | | 10.1 | |
| BaO | | | | | | | | | | | 21.0 | |
| CaO | | | | | | | | 4.5 | | | | |
| BeO | | | | | | | | | | | | 6.1 |
| Sb$_2$O$_3$ | | | | | | | | 1.8 | | | | |
| ZrO$_2$ | | | | | | | | | 1.3 | 1.4 | 1.1 | |

As an illustration of the preparation of my novel vitreous compositions and of their improved properties, vitreous material A of Tables III and IV was prepared in frit form by melting Batch A of Table II and pouring the homogeneous melt into water. The fritted product was then ground to yield a fine powder. The powder was then baked at a temperature of 450° C. for one hour to facilitate subsequent electrical capacitor manufacturing operations, this step being in accordance with the procedure disclosed and claimed in my copending application, Serial No. 504,889, filed October 4, 1943. The so-treated vitreous composition was then fabricated into an electrical capacitor unit of the novel type disclosed in the copending application of Deyrup and Ballard, Serial No. 504,882, filed October 4, 1943. A firing temperature of 740° C. was utilized in the fabrication. The resulting capacitor, when tested, was found to have a Q-value of 5000 at 1000 kilocycles per second. This is an electrical efficiency higher than that of any previously known vitreous composition melting below the melting range of fused quartz.

It is to be noted that many of the compositions of Tables II, III and IV devitrify quite readily. Surprisingly this devitrification does not impair the electrical efficiency. This tendency to devitrification, while disadvantageous for some fabrication methods and generally avoided in the enameling arts, is a distinct advantage in fabrication of capacitors or insulators from powder by sintering because compositions selected for facile devitrification are not prone to warp or deform from their desired shape when subjected to moderate overfiring. I find that the tendency to devitrify can be decreased by choosing compositions with a higher ratio of mole percent silica ($SiO_2$) to total sum of mole percent lead oxide (PbO) and mole percents of divalent metal oxides (MgO, SrO, ZnO, BaO, CaO, and BeO), this ratio preferably remaining between the limits of 0.65:1 and 1.5:1. On the other hand, choice of compositions with the aforesaid ratio at lower values within the range cited generally results in securing the best electrical properties obtainable.

By preparing vitreous compositions within the above-defined ranges of components, I have found it possible to consistently produce capacitors having a Q-value of over 2000. The unusual electrical efficiency of vitreous compositions prepared in accordance with my invention is indeed surprising, since it had previously been considered essential that the alkali metal oxides be excluded insofar as possible from glass compositions which were intended for utilization in the manufacture of electrical apparatus. I have found that the remarkable electrical properties of my novel vitreous compositions do not result from the presence or absence of any one constituent in the glass products, but are the result of the presence of the constituents noted and their utilization in the particular composition ranges disclosed.

It will be understood that many varied raw materials may be used which will decompose in melting to produce the oxides required in the compositions of Tables I, II and III. The expression of the fluorine content as alkali metal fluoride in Table I does not preclude its introduction to the batch in other forms, such as fluorspar $CaF_2$, together with sufficient alkali metal oxide compounds also added to the batch. Since reactions such as:

$$CaF_2 + Na_2O \rightleftharpoons 2NaF$$

occur reversibly during melting, vitreous compositions made in this manner are, I find, equivalent to those made with alkali metal fluoride added to the batch. Thus the expression of the fluorine content as alkali metal fluoride in Table I does not limit the scope of this invention to those vitreous compositions in which alkali metal fluoride was used in the batch, but serves to define the stoichiometric composition range of these novel compositions of high electrical efficiency, all fluorine being expressed as alkali metal fluorides.

As many variations may be made in my improved vitreous compositions, certain preferred embodiments of which are herein disclosed, without departing from the scope of the invention, it is my intention that such variations shall be included within its scope to the extent that they are comprehended within the appended claims.

I claim:

1. A vitreous composition having a Q-value of over 2000 and comprising between 15 and 25 mole percent of lead oxide, between 34 and 47 mole percent of silica, between 3 and 11 mole percent of at least one alkali metal oxide taken from the group consisting of potassium oxide, sodium oxide and lithium oxide, between 5 and 11 mole percent of at least one alkali metal fluoride taken from the group consisting of sodium fluoride, potassium fluoride and lithium fluoride, between 11 and 30 mole percent of at least one bivalent metal oxide taken from the group consisting of magnesium oxide, strontium oxide, zinc oxide, barium oxide, calcium oxide and beryllium oxide, said mole percentages being based on the total molecular weight of the vitreous composition.

2. A vitreous composition having a Q-value of over 2000 and comprising between 15 and 25 mole percent of lead oxide, between 34 and 47 mole percent of silica, a total of between 3 and 11 mole percent of a plurality of alkali metal oxides taken from the group consisting of potassium oxide, sodium oxide and lithium oxide, between 5 and 11 mole percent of at least one alkali metal fluoride taken from the group consisting of sodium fluoride, potassium fluoride and lithium fluoride, between 11 and 30 mole percent of at least one bivalent metal oxide taken from the group consisting of magnesium oxide, strontium oxide, zinc oxide, barium oxide, calcium oxide and beryllium oxide, said mole percentages being based on the total molecular weight of the vitreous composition.

3. A vitreous composition having a Q-value of over 2000 and comprising between 15 and 25 mole percent of lead oxide, between 34 and 47 mole percent of silica, between 3 and 11 mole percent of at least one alkali metal oxide taken from the group consisting of potassium oxide, sodium oxide and lithium oxide, between 5 and 11 mole percent of at least one alkali metal fluoride taken from the group consisting of sodium fluoride, potassium fluoride and lithium fluoride, a total of between 11 and 30 mole percent of a plurality of bivalent metal oxides taken from the group consisting of magnesium oxide, strontium oxide, zinc oxide, barium oxide, calcium oxide and beryllium oxide, said mole percentages being based on the total molecular weight of the vitreous composition.

4. A vitreous composition having a Q-value of over 2000 and comprising between 15 and 25 mole percent of lead oxide, between 34 and 47 mole percent of silica, a total of between 3 and 11 mole percent of a plurality of alkali metal oxides taken from the group consisting of potassium oxide, sodium oxide and lithium oxide, between 5 and 11 mole percent of at least one alkali metal fluoride taken from the group consisting of sodium fluoride, potassium fluoride and lithium fluoride, a total of between 11 and 30 mole percent of a plurality of bivalent metal oxides taken from the group consisting of magnesium oxide, strontium oxide, zinc oxide, barium oxide, calcium oxide and beryllium oxide, said mole percentages being based on the total molecular weight of the vitreous composition.

5. A vitreous composition having a Q-value of over 2000 and comprising between 15 and 25 mole percent of lead oxide, between 34 and 47 mole percent of silica, between 3 and 11 mole percent of at least one alkali metal oxide taken from the group consisting of potassium oxide, sodium oxide and lithium oxide, between 5 and 11 mole percent of at least one alkali metal fluoride taken from the group consisting of sodium fluoride, potassium fluoride and lithium fluoride, between 11 and 30 mole percent of at least one bivalent metal oxide taken from the group consisting of magnesium oxide, strontium oxide, zinc oxide, barium oxide, calcium oxide and beryllium oxide, the ratio of the mole percent of silica to the mole percent of the sum of lead oxide and bivalent metal oxide in the composition being between 0.65:1 and 1.5:1, said mole percentages being based on the total molecular weight of the vitreous composition.

6. A vitreous composition having a Q-value of over 2000 and comprising between 15 and 25 mole percent of lead oxide, between 34 and 47 mole percent of silica, a total of between 3 and 11 mole percent of a plurality of alkali metal oxides taken from the group consisting of potassium oxide, sodium oxide and lithium oxide, between 5 and 11 mole percent of at least one alkali metal fluoride taken from the group consisting of sodium fluoride, potassium fluoride and lithium fluoride, between 11 and 30 mole percent of at least one bivalent metal oxide taken from the group consisting of magnesium oxide, strontium oxide, zinc oxide, barium oxide, calcium oxide and beryllium oxide, the ratio of the mole percent of silica to the mole percent of the sum of lead oxide and bivalent metal oxide in the composition being between 0.65:1 and 1.5:1, said mole percentages being based on the total molecular weight of the vitreous composition.

7. A vitreous composition having a Q-value of over 2000 and comprising between 15 and 25 mole percent of lead oxide, between 34 and 47 mole percent of silica, between 3 and 11 mole percent of at least one alkali metal oxide taken from the group consisting of potassium oxide, sodium oxide and lithium oxide, between 5 and 11 mole percent of at least one alkali metal fluoride taken from the group consisting of sodium fluoride, potassium fluoride and lithium fluoride, a total of between 11 and 30 mole percent of a plurality of bivalent metal oxides taken from the group consisting of magnesium oxide, strontium oxide, zinc oxide, barium oxide, calcium oxide and beryllium oxide, the ratio of the mole percent of silica to the mole percent of the sum of lead oxide and bivalent metal oxide in the composition being between 0.65:1 and 1.5:1, said mole percentages being based on the total molecular weight of the vitreous composition.

8. A vitreous composition having a Q-value of over 2000 comprising between 15 and 25 mole percent of lead oxide, between 34 and 47 mole percent of silica, a total of between 3 and 11 mole percent of a plurality of alkali metal oxides taken from the group consisting of potassium oxide, sodium oxide and lithium oxide, between 5 and 11 mole percent of at least one alkali metal fluoride taken from the group consisting of sodium fluoride, potassium fluoride and lithium fluoride, a total of between 11 and 30 mole percent of a plurality of bivalent metal oxides taken from the group consisting of magnesium oxide, strontium oxide, zinc oxide, barium oxide, calcium oxide and beryllium oxide, the ratio of the mole percent of silica to the mole percent of the sum of lead oxide and bivalent metal oxide in the composition being between 0.65:1 and 1.5:1, said mole percentages being based on the total molecular weight of the vitreous composition.

9. A vitreous composition having a Q-value of over 2000 and comprising between 15 and 25 mole percent of lead oxide, between 34 and 47 mole percent of silica, between 3 and 11 mole percent of at least one alkali metal oxide taken from the group consisting of potassium oxide, sodium oxide and lithium oxide, between 5 and 11 mole percent of at least one alkali metal fluoride taken from the group consisting of sodium fluoride, potassium fluoride and lithium fluoride, between 11 and 30 mole percent of at least one bivalent metal oxide taken from the group consisting of magnesium oxide, strontium oxide, zinc oxide, barium oxide, calcium oxide and beryllium oxide, and between 1% and 4% antimony oxide, said mole percentages being based on the total molecular weight of the vitreous composition.

10. A vitreous composition having a Q-value of over 2000 and comprising between 15 and 25 mole percent of lead oxide, between 34 and 47 mole percent of silica, between 3 and 11 mole percent of at least one alkali metal oxide taken from the group consisting of potassium oxide, sodium oxide and lithium oxide, between 5 and 11 mole percent of at least one alkali metal fluoride taken from the group consisting of sodium fluoride, potassium fluoride and lithium fluoride, a total of between 11 and 30 mole percent of magnesium oxide, strontium oxide and zinc oxide, said mole percentages being based on the total molecular weight of the vitreous composition.

ALDEN J. DEYRUP.